G. H. LITTLE.
Injector.
No. 8,105. Reissued Feb. 26, 1878.
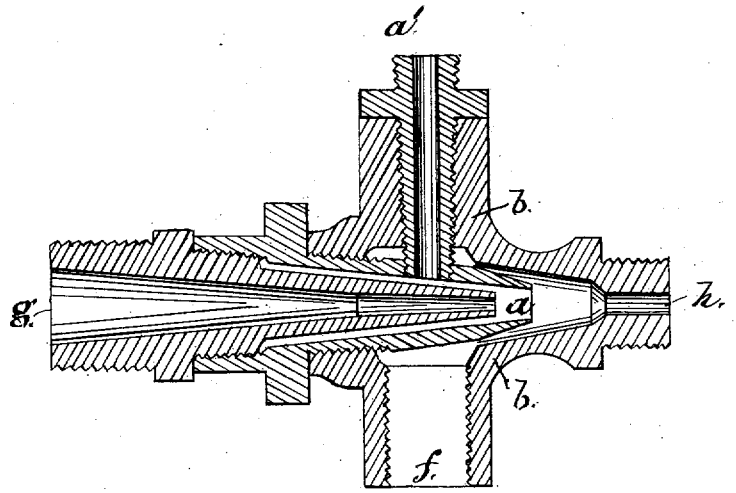
Witnesses:
Pennington & Halsted
Charles T. Burr
Inventor:
Geo. H. Little
per John J. Halsted,
his Atty.
N. PETERS, PHOTO-LITHOGRAPHER, WASHINGTON, D. C.

UNITED STATES PATENT OFFICE.

GEORGE H. LITTLE, OF PEABODY, MASSACHUSETTS.

IMPROVEMENT IN INJECTORS.

Specification forming part of Letters Patent No. 165,843, dated July 20, 1875; Reissue No. 8,105, dated February 26, 1878; application filed February 20, 1877.

DIVISION B.

*To all whom it may concern:*

Be it known that I, GEORGE H. LITTLE, of Peabody, in the State of Massachusetts, have invented new and useful Improvements in Injectors, and which are fully set forth in the following specification and accompanying drawing.

My invention consists, mainly, in combining together an ejector and an injector, the ejector provided with a passage through it adapted for carrying a solid jet or current of steam within and through the regular steam-tube of the injector, the combination being such that the injector and ejector may each have its own independent supply of steam; in such an arrangement of the steam-tube of an ejector within the forcing-tube of the injector that it is adapted to create a vacuum in the mixing chamber or tube of the injector, and to combine the two jets of steam after the water has been lifted, such combined jets operating to force the water into the boiler or against pressure; and in certain details of construction, as hereinafter set forth.

The tube *g* of the ejector is adapted to be inserted within, and may be screwed or fastened to, the forcing-tube *a* of the injector, the body *b* of the injector having a water-inlet, *f*, and an outlet, *h*. Another steam-tube, *a'*, serves to admit steam to the tube *a*, which surrounds the ejector, this steam-tube *a'* being adapted to receive its supply of steam from the same or from a different source from or independent of that which supplies the ejector-tube *g*.

Any ordinary or appropriate connections or valves may, of course, be used to connect with the inlet ends of the parts *g* and *a'*, so that steam may pass into or through either one or both at the same time, as the case may require.

The passage through *g*, it will be seen, is adapted to carry a solid jet or current of steam within and through the regular steam-tube of the injector, and it serves to create a vacuum or partial vacuum in the mixing chamber or tube of the injector, for the purpose of lifting the water, and this jet of steam combining with that of the tube *a* after the water has been raised, they jointly operate to force it into the boiler or against other pressure, as the case may be.

It will be seen that the construction is adapted to be worked by a current or currents of steam, or of compressed air or liquids, to create a vacuum and raise liquids at starting, in connection with other apparatus, to feed the water or liquid so raised and started into boilers or tanks, or to introduce air or steam, or air and steam, or exhaust-steam, into steam-pipes for increasing the power of the engine.

It will also be seen that a single jet of steam is all that is necessary in certain cases, where the combined ejector and injector may be used.

I claim—

1. In a combined ejector and injector, a passage through the ejector adapted for carrying a solid jet or current of steam within and through the regular steam-tube of the injector, the combination being such that the injector and ejector may each have its own independent supply of steam.

2. In a combined ejector and injector, the steam-tubes *a'*, *a*, and *g*, and the water-inlet *f* and outlet *h*, these parts being arranged and operating substantially as and for the purpose set forth.

3. The steam-tube of an ejector arranged within the forcing-tube of an injector having a supply of steam independently of such ejector, and adapted to create a vacuum or partial vacuum in the mixing chamber or tube of the injector, and to combine the two jets of steam after the water has been lifted, such combined jets operating to force the water into the boiler or against other pressure.

4. The two independent steam-tubes, arranged relatively to each other and to the water-tube, substantially as set forth, whereby one water inlet and outlet serves for both the ejector and injector, or for either.

GEORGE H. LITTLE.

Witnesses:
B. C. PERKINS,
WM. H. LITTLE.